(12) United States Patent
Yang et al.

(10) Patent No.: US 12,344,942 B2
(45) Date of Patent: Jul. 1, 2025

(54) PROTON EXCHANGE MEMBRANE WATER ELECTROLYZER MEMBRANE ELECTRODE ASSEMBLY

(71) Applicant: PLUG POWER INC., Latham, NY (US)

(72) Inventors: Fan Yang, Latham, NY (US); Chao Lei, Latham, NY (US); Arthur Griffith, Latham, NY (US); Robert Stone, Latham, NY (US); Cortney Mittelsteadt, Latham, NY (US)

(73) Assignee: PLUG POWER INC., Slingerlands, NY (US)

( * ) Notice: Subject to any disclaimer, the term of this patent is extended or adjusted under 35 U.S.C. 154(b) by 0 days.

(21) Appl. No.: 17/590,971

(22) Filed: Feb. 2, 2022

(65) Prior Publication Data

US 2022/0243344 A1 Aug. 4, 2022

Related U.S. Application Data

(60) Provisional application No. 63/144,539, filed on Feb. 2, 2021.

(51) Int. Cl.
*C25B 11/081* (2021.01)
*C25B 1/04* (2021.01)
(Continued)

(52) U.S. Cl.
CPC .................. *C25B 1/04* (2013.01); *C25B 9/19* (2021.01); *C25B 11/053* (2021.01);
(Continued)

(58) Field of Classification Search
CPC ........................ C25B 13/04–13/08; C25B 1/04
See application file for complete search history.

(56) References Cited

U.S. PATENT DOCUMENTS 6,500,217 B1 12/2002 Starz et al.
6,696,190 B2 2/2004 Haridoss
(Continued)

FOREIGN PATENT DOCUMENTS

CN 101463487 A 6/2009
EP 2927998 A1 10/2015
(Continued)

OTHER PUBLICATIONS

Klose et al ("Membrane Interlayer with Pt Recombination Particles for Reduction of the Anodic Hydrogen Content in PEM Water Electrolysis", Journal of The Electrochemical Society, 165, 16, 2018, pp. F1271-F1277) (Year: 2018).*
(Continued)

*Primary Examiner* — Alexander W Keeling
(74) *Attorney, Agent, or Firm* — Heslin Rothenberg Farley & Mesiti P.C.; Victor A. Cardona, Esq.

(57) ABSTRACT

An exchange membrane includes, for example, a first layer membrane having a first thickness, a second layer membrane having a thickness less than the first thickness, and the second layer membrane containing a catalyst, a catalyst content in the second layer membrane being greater than a catalyst content in the first layer membrane, and the exchange membrane having an interface between the first layer membrane and the second layer membrane. In some embodiments, the membrane electrode assembly (MEA) includes the first layer membrane without a catalyst, and/or the exchange membrane includes a bi-layer exchange membrane.

20 Claims, 15 Drawing Sheets

(51) Int. Cl.
  *C25B 9/19*   (2021.01)
  *C25B 11/053*  (2021.01)
  *C25B 13/02*  (2006.01)
  *C25B 13/08*  (2006.01)
(52) U.S. Cl.
  CPC ............ *C25B 11/081* (2021.01); *C25B 13/02* (2013.01); *C25B 13/08* (2013.01)

(56) References Cited

U.S. PATENT DOCUMENTS

| | | | |
|---|---|---|---|
| 7,132,188 | B2 | 11/2006 | Masel et al. |
| 7,691,507 | B2 | 4/2010 | Ballantine |
| 8,962,132 | B2 | 2/2015 | Liu et al. |
| 11,124,885 | B2 | 9/2021 | Xu et al. |
| 2002/0058172 | A1 | 5/2002 | Datz et al. |
| 2004/0023105 | A1 | 2/2004 | Hohenthanner et al. |
| 2005/0053818 | A1 | 3/2005 | St-Arnaud et al. |
| 2015/0290594 | A1* | 10/2015 | Van Berchum .... B01D 67/0006 427/244 |
| 2015/0322578 | A1 | 11/2015 | Wakabayashi et al. |
| 2015/0368817 | A1 | 12/2015 | Xu et al. |
| 2017/0317370 | A1 | 11/2017 | Kang et al. |
| 2017/0321334 | A1 | 11/2017 | Kuhl et al. |
| 2018/0062192 | A1 | 3/2018 | Capuano et al. |
| 2019/0134570 | A1 | 5/2019 | Pintauro et al. |
| 2019/0296364 | A1* | 9/2019 | Nakano .................... C25B 9/73 |
| 2020/0099061 | A1 | 3/2020 | Price et al. |
| 2020/0102660 | A1 | 4/2020 | Lewinski et al. |
| 2020/0240023 | A1 | 7/2020 | Cave et al. |
| 2021/0305598 | A1 | 9/2021 | Hamdan et al. |
| 2021/0384540 | A1 | 12/2021 | Mistry et al. |
| 2021/0395908 | A1 | 12/2021 | Kuhl et al. |
| 2022/0216494 | A1* | 7/2022 | Minamibayashi .. H01M 8/1069 |
| 2022/0243339 | A1 | 8/2022 | Yang et al. |
| 2022/0243344 | A1 | 8/2022 | Yang et al. |

FOREIGN PATENT DOCUMENTS

| | | |
|---|---|---|
| FR | 2624885 | 6/1998 |
| JP | 2006107914 A | 4/2006 |
| KR | 1020080090079 A | 10/2008 |
| KR | 102291160 B1 | 8/2021 |
| WO | 2015193211 A1 | 12/2015 |
| WO | 2016048309 A1 | 3/2016 |
| WO | 2022169844 A1 | 8/2022 |
| WO | 2022169851 A1 | 8/2022 |

OTHER PUBLICATIONS

Li et al ("Bilayer Anion-Exchange Membrane with Low Borohydride Crossover and Improved Fuel Efficiency for Direct Borohdyride Fuel Cell", ACS Appl. Mater. Interfaces 2020, 12, 27184-27189) (Year: 2020).*
Liu et al ("The use of polypyrrole modified carbon-supported cobalt hydroxide as cathode and anode catalysts for the direct borohydride fuel cell", Journal of Power Sources 192 (2009) 385-390). (Year: 2009).*
Guella et al ("Kinetic Features of the Platinum Catalyzed Hydrolysis of Sodium Borohydride from 11B NMR Measurements", J. Phys . Chem. C 2007, 111, 18744-18750) (Year: 2007).*
Qin ("Introducing catalyst in alkaline membrane for improved performance direct borohydride fuel cells", Journal of Power Sources 374 (2018) 113-120) (Year: 2018).*
Abdu et al ("Catalytic Polyelectrolyte Multilayers at the Bipolar Membrane Interface", ACS Appl. Mater. Interfaces, 2013, 5, 10445-10455). (Year: 2013).*
Membrane Interlayer with Pt Recombination Particles for Reduction of the Anodic Hydrogen Content in PEM Water Electrolysis, Journal of The Electrochemical Society, 165 (16) F1271-F1277 (2018).

Yang et al., Notification of Transmittal, International Search Report and Written Opinion for PCT/US 2022/014914 titled "Proton Exchange Membrane Water Electrolyzer Membrane Electrode Assembly", 9 pages, dated May 12, 2022.
Yang et al., Notification of Transmittal, International Search Report and Written Opinion for PCT/US 2022/014905 titled "Proton Exchange Membrane Water Electrolyzer Membrane Electrode Assembly", 9 pages, dated May 12, 2022.
C. Klose, et al., Membrane Interlayer with Pt Recombination Particles for Reduction of the Anodic Hydrogen Content in PEM Water Electrolysis, Journal of The Electrochemical Society, 165 (16) F1271-F1277, 2018.
Fan Yan, Chao Lei, Arthur Griffith, Robert Stone and Cortney Mittlesteadt, U.S. Appl. No. 17/590,969, filed Feb. 2, 2022, entitled "Proton Exchange Membrane Water Electrolyzer Membrane Electrode Assembly".
Mittelsteadt et al., International Patent Application PCT/US223/076844, entitled "Recombination Layers for Crossover Mitigation for Exchange Membranes and Water Electrolyzer Membrane Electrode Assemblies," filed on Oct. 13, 2023.
Mittelsteadt et al., International Search Report and Written Opinion for PCT/US2023/076844, entitled "Recombination Layers for Crossover Mitigation for Exchange Membranes Andwater Electrolyzer Membrane Electrode Assemblies," 12 pages, dated Feb. 14, 2024.
"Unfolding the Complex Relations between Morphology, Viscoeleastic Properties, Hydration Behavior and (Proton, Water) Transport in Poly-Electrolytes and Ionomers such as NAFION®," Max Planck Institute for Solid State Research, printout retrieved on Aug. 7, 2023, available at https://www.fkf.mpg.de/5952672/kd7, Wayback Verification Crawl Presence dated Oct. 1, 2020, 7 pages, Oct. 1, 2020.
Stahler et al., "Scalable Implementation of Recombination Catalyst Layers to Mitigate Gas Crossover in PEM Water Electrolyzers," Journal of The Electrochemical Society, 169, 034522, 9 pages, Mar. 21, 2022.
Millet et al., "Precipitation of Metallic Platinum into Nafion Ionomer Membranes," J. Electrochem. Soc., vol. 140, No. 5, pp. 1373-1380, May 1993.
Shin et al., "Improving the Mechanical Durability of Short-Side-Chain Perfluorinated Polymer Electrolyte Membranes by Annealing and Physical Reinforcement," ACS Omega 2019, 4, 19153-19163, 11 pages, 2019.
Sode et al., "Controlling the deposition of Pt nanoparticles within the surface region of Nafion," Journal of Membrane Science, vol. 376, Issues 1-2, pp. 162-169, abstract, highlights, introduction, 6 pages, Jul. 2011.
Klaus-Dieter Kreuer and Giuseppe Portale, "A Critical Revision of the Nano-Morphology of Proton Conducting Ionomers and Polyelectrolytes for Fuel Cell Applications," Adv. Funct. Mater. 2013, 23, 5390-5397, 8 pages, 2013.
Kreuer et al., "Short-side-chain proton conducting perfluorosulfonic acid ionomers: Why they perform better in PEM fuel cells," Journal of Power Sources 178 (2008) 499-509, 11 pages, 2008.
Kreuer, "On the development of proton conducting polymer membranes for hydrogen and methanol fuel cells," Journal of Membrane Science 185 (2001) 29-39, 11 pages, 2001.
Melchior et al., "About the Interactions Controlling Nafion's Viscoelastic Properties and Morphology," Macromolecules 2015, 48, 8534-8545, 12 pages, 2015.
Kreuer, "The role of internal pressure for the hydration and transport properties of ionomers and polyelectrolytes," Solid State Ionics 252 (2013) 93-101, 12 pages, 2013.
Kreuer et al., "Membrane Materials for PEM-Fuel-Cells: A Microstructural Approach," available In Proton Conducting Membrane Fuel Cells I, edited by Landgrebe et al, vol. PV 95-23, The Electrochemical Society, Pennington, NJ, 1995, pp. 241-246, 1995.
Yang et al., Partial Supplemental European Search Report, European Patent Application N22750305.9, 15 pages, Feb. 18, 2025.
Leddy et al. ("Density and Solubility of Nation: Recast, Annealed, and Commercial Films", Anal. Chem., 1996, 68, 3793-3796), 4 pages, (Year: 1996).
Mirsherkari et al. ("High performance and cost-effective membrane electrode assemblies for advanced proton exchange membrane

(56) References Cited

OTHER PUBLICATIONS water electrolyzes: Long-term durability assessment," Int. J. Hydrogen Energy 2021, 46, 1526-1529), 14 pages, (Year: 2021).
Yang et al. ("Operation of thin Nation-based self-humidifying membranes in proton exchange membrane fuel cells with dry H2 and 02," J. Power Sources 2004, 139, 170-175), 6 pages, (Year: 2005).
Chen et al. ("High-rate roll-to-roll stack and lamination of multilayer structured membrane electrode assembly," J. Manuf. Process. 2016, 23, 175-182), 8 pages, (Year: 2016).
Nation Product Bulletin P-14: Chemours Published in 2020, 2 pages, (Year: 2020).
Park et al. ("Roll-to-roll production of catalyst coated membranes for low-temperature electrolyzers," J. Power Sources 2020, article 228819, pages 1-9), 9 pages, (Year: 2020).
Stahler et al. ("A completely slot die coated membrane electrode assembly," Int. J. Hydrogen Energy 2019, 44, 7053-7058), 6 pages, (Year: 2019).
Du et al. ("Effects of ionomer and dispersion methods on the rheological behavior of proton exchange membrane fuel cell catalyst ink," Int. J. Hydrogen Energy 2020, 45(53), 29430-29441), 12 pages, (Year: 2020).
Yang et al, First Office Action for U.S. Appl. No. 17/590,969, mailed April 3, 2025, 30 pages. 30 pages, April 3, 2025.

\* cited by examiner

PROTON EXCHANGE MEMBRANE WATER ELECTROLYZER MEMBRANE ELECTRODE ASSEMBLY

CLAIM TO PRIORITY

This application claims priority benefit of U.S. provisional patent application No. 63/144,539 filed Feb. 2, 2021, entitled "Proton Exchange Membrane Water Electrolyzer Membrane Electrode Assembly," which application is incorporated herein by reference in its entirety.

CROSS-REFERENCE TO RELATED APPLICATION

This application is related to commonly assigned, patent application Ser. No. 17/590,969, filed on Feb. 2, 2022, entitled "Proton Exchange Membrane Water Electrolyzer Membrane Electrode Assembly", which is hereby incorporated herein by reference in its entirety.

TECHNICAL FIELD

The present disclosure relates generally to proton exchange membrane water electrolyzer membrane electrode assemblies (MEAs), and more particularly, fabrication of membranes for water electrolyzer membrane electrode assemblies (MEAs).

BACKGROUND

The utilization of renewable energy has driven substantial investments into water electrolysis technologies. It is estimated that the water electrolysis market could increase to 300 GW over the next two decades, and power-to-gas is poised to become a multi-billion-dollar market for on-site electrolyzer systems over the next decade.

A proton exchange membrane (PEM) electrolysis cell is a device which produces hydrogen and oxygen gas by using DC electricity to electrochemically split water. A PEM cell contains an "active area" in which the presence of catalyst permits the reactions to take place. In the electrolysis cell, the water enters the anode and is split into protons, electrons, and oxygen gas. The protons are conducted through the membrane while the electrons pass through the electrical circuit. At the cathode, the protons and electrons recombine to form hydrogen gas. The electrolysis half-reactions are shown below.

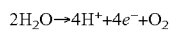

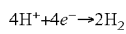

FIG. 1 illustrates a prior art wet process 10 for forming a wet membrane for a proton exchange membrane water electrolyzer membrane electrode assembly. In the wet process, at block 12 an ionomer membrane (e.g., Nafion N115) is received, and at block 14 the ionomer membrane is boiled for one hour for hydration. At block 16, the hydrated membrane then goes through a multiple-step platinization process for crossover mitigation purposes that takes approximately five days in total. At block 18, after the membrane platinization, the membrane is then exchanged back to the H+ form, and at block 20, rinsed and boiled in deionized water. Once the membrane is processed, it has to be kept wet during the cell assembly process.

Klose et al. developed an 8 mil tri-layer membrane using a spray coating containing Pt to form an interlayer between NR212 and N115 membranes. C. Klose et al 2018, Membrane Interlayer with Pt Recombination Particles for Reduction of the Anodic Hydrogen Content in PEM Water Electrolysis, J. Electrochem. Soc. 165 F1271.

SUMMARY

Shortcomings of the prior art are overcome and additional advantages are provided through the provision of an exchange membrane including, for example, a first layer membrane having a first thickness, a second layer membrane having a thickness less than the first thickness, and the second layer membrane containing a catalyst, a catalyst content in the second layer membrane being greater than a catalyst content in the first layer membrane, and the exchange membrane having an interface between the first layer membrane and the second layer membrane.

In some embodiments, a membrane electrode assembly (MEA) having exchange membrane includes, for example, a first layer membrane having a first thickness, a second layer membrane having a thickness less than the first thickness, and the second layer membrane containing a catalyst, the catalyst content in the second layer membrane being greater than a catalyst content in the first layer membrane, the first layer membrane and the second layer membrane defining an exchange membrane having an interface between the first layer membrane and the second layer membrane, an anode electrode disposed on the second layer membrane, and a cathode electrode disposed on the first layer membrane.

In some embodiments, the first layer membrane includes the first layer membrane without a catalyst, and/or the exchange membrane includes a bi-layer exchange membrane.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure is directed to an exchange membranes and membrane electrode assemblies (MEAs) employing such exchange membranes. For example, the exchange membranes may be bi-layer electrolyzer membranes for a water electrolyzer membrane electrode assemblies (MEAs) whereby a recombination catalyst such as platinum (Pt) is favorably deposited on one side of the exchange membrane structures, as an example on only one side, preferably near the electrode with the low-pressure side of the electrolyzer. It will be appreciated that the exchanges membrane may include solely a bi-layer exchanges membrane or a bi-layer membrane with additional membrane layers. For example, in an electrolyzer with high pressure hydrogen and low pressure oxygen, hydrogen will permeate more quickly, and therefore the platinum (Pt) recombination catalyst is preferable near the oxygen electrode. Similarly, in a high-pressure oxygen configuration the Pt/ionomer layer will preferably be closer to the hydrogen (cathode) side of the membrane electrode assembly. Also disclosed are methods of manufacturing the exchange membranes and membrane electrode assembly (MEA) structures.

As will be appreciated from the present description, the techniques of the present disclosure for forming, for example, bi-layer membranes have demonstrated the capability of dry processes for PEM electrolyzer MEA fabrication without sacrificing performance compared to wet processing. The dry processes may save on total capital cost for PEM electrolyzer fabrication by replacing labor-intensive and time-consuming wet membrane platinization process with simple mitigation layer casting and dry lamination processes. In addition to the labor cost, the bi-layer membrane design will also save on material cost. The amount of platinum recombination catalyst in the membrane may be substantially reduced by applying the catalyst in a 1.5 mil layer of the membrane close to the anode catalyst layer instead of inefficiently distributing the recombination catalyst through the whole membrane.

As described below, in some embodiments, a thin layer of platinum (Pt) nanoparticles may be laminated on top of the Nafion membrane to replace the traditional platinum (Pt) doping in the whole membrane. Such processes may reduce the amount of Pt used in the membrane (for example, about 1 wt. % to about 5% wt. %), but may also improve the durability and reliable of the PEMWE devices. In addition, by avoiding a wet assembling process, the process may be easier to be integrated into a roll to roll (R2R) process for MEA fabrication, which may increase efficiency and save on labor involved.

Figure 1:
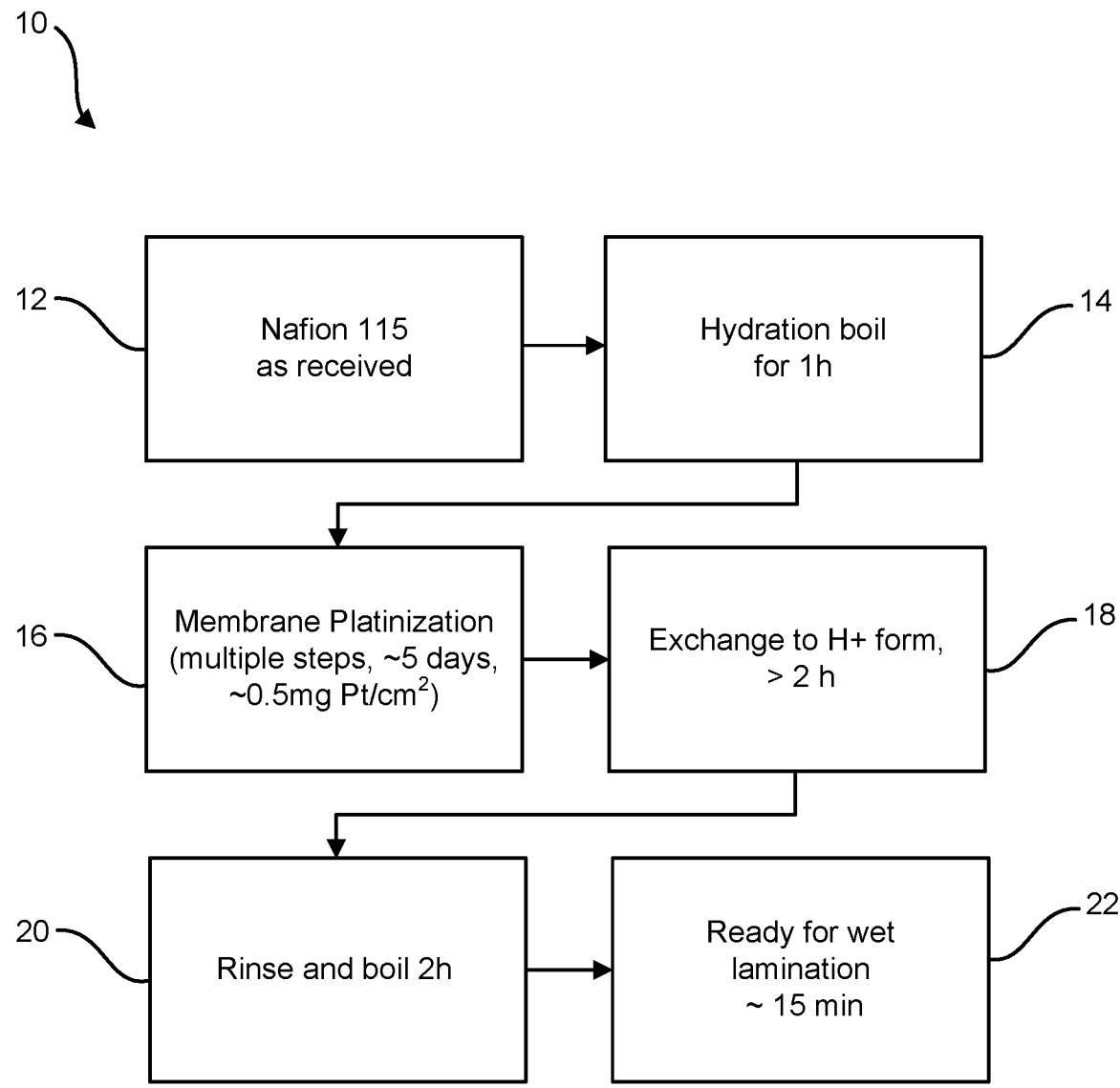
FIG. 1 is a flowchart of a prior art wet processing method for forming a catalyst membrane for use in a membrane electrode assembly.
Figure 2:
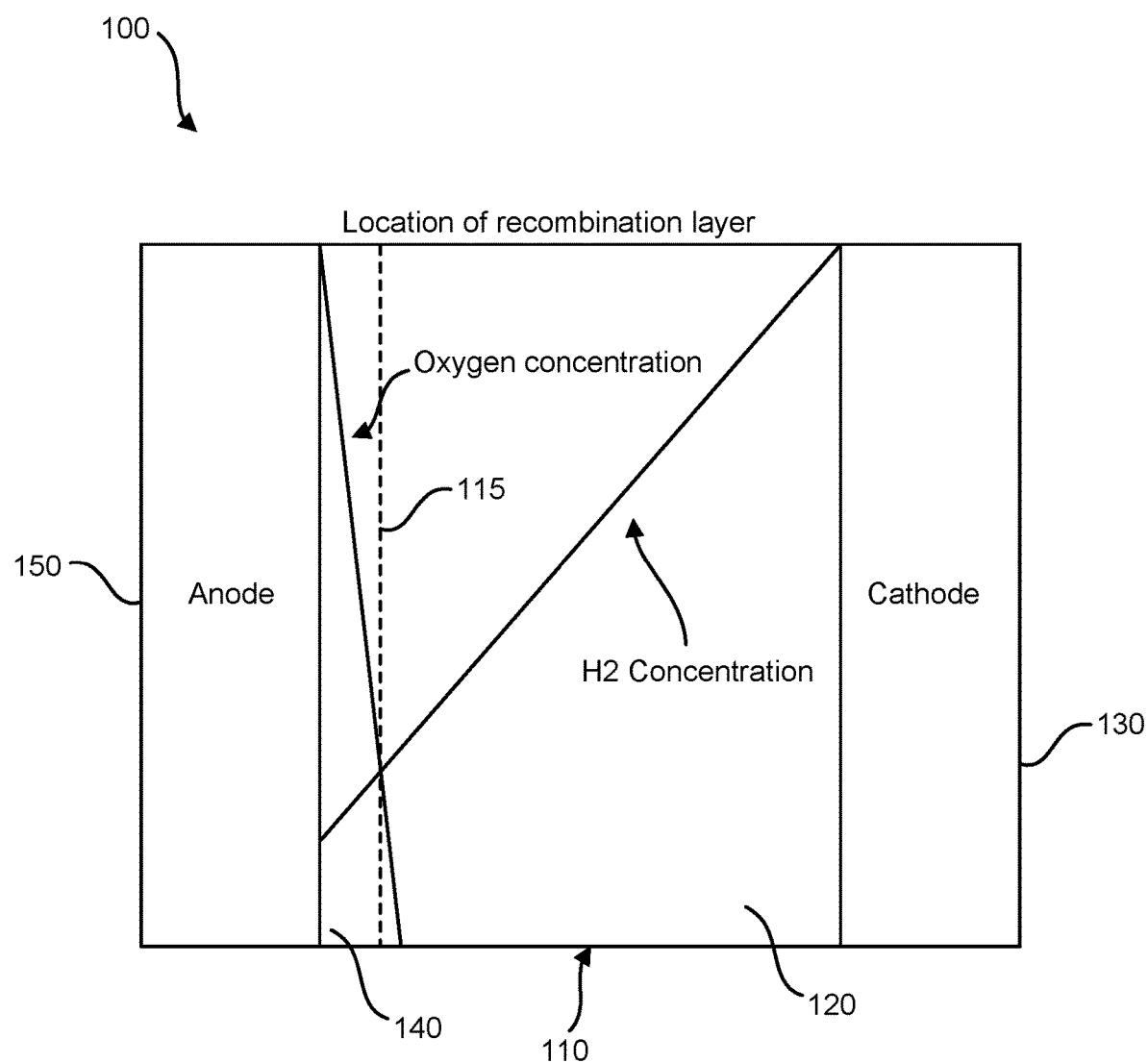
FIG. 2 is a membrane electrode assembly employing an exchange membrane, according to an embodiment of the present disclosure.

FIG. 2 illustrates a membrane electrode assembly (MEA) 100 employing an exchange membrane 110, according to an embodiment of the present disclosure. For example, exchange membrane 110 may include a first layer membrane 120, a second layer membrane 140, a cathode electrode 130, and an anode electrode 150. First layer membrane 120 has a first thickness, second layer membrane 140 has a thickness less than the first thickness, and second layer membrane 140 contains a catalyst content that is greater than a catalyst content in first layer membrane 120. First layer membrane 120, second layer membrane 140, cathode electrode 130, and anode electrode 150 are formed into membrane electrode assembly 100 (MEA) having an exchange membrane 110 with an interface 115 between first layer membrane 120 and second layer membrane 140. As described below, exchange membrane may have two different layer membranes, and formed by the fabrication process described below or other suitable processes. It will be appreciated that the exchange member may have more than two distinct layers wherein two of the layers provide an interface between the layers having differing catalyst content such as second layer member having less catalyst or on catalyst compared to the first layer membrane having a catalyst or greater catalyst content.

As will be appreciated, the present configuration of the bi-layer exchange membrane in an MEA electrolyzer may include avoiding the need for hydrogen pumps and/or mitigating the H2 crossover to reduce safety hazard, and be desirable for high pressure large scale water electrolyzer cells. Hydrogen is often purified and/or compressed so that it can be stored for usage. Hydrogen pumps have been used for hydrogen purification and/or compression of hydrogen rich gas. Currently, high pressure storage is required to improve the energy density of hydrogen fuel. It is more efficient to directly pressurize the H2 from the electrolysis process compared to using downstream mechanical compressors. However, the high differential pressure in electrolyzer cells introduces an H2 crossover issue due to the increased likelihood of H2 permeating the membrane and combining with O2 in the cathode. One common approach for the H2 crossover mitigation is the dispersion of recombination catalyst (such as platinum) throughout the membrane. This material serves to catalyze the reaction between crossover-H2 with O2 on surface of the cathode side of the membrane. However, when scaled up the long processing and material cost of platinum catalyst used in the membrane increases labor and material cost which prevents current manufacturing process to meet the supply, cost and timeline of 1 MW stack orders.

Figure 3:
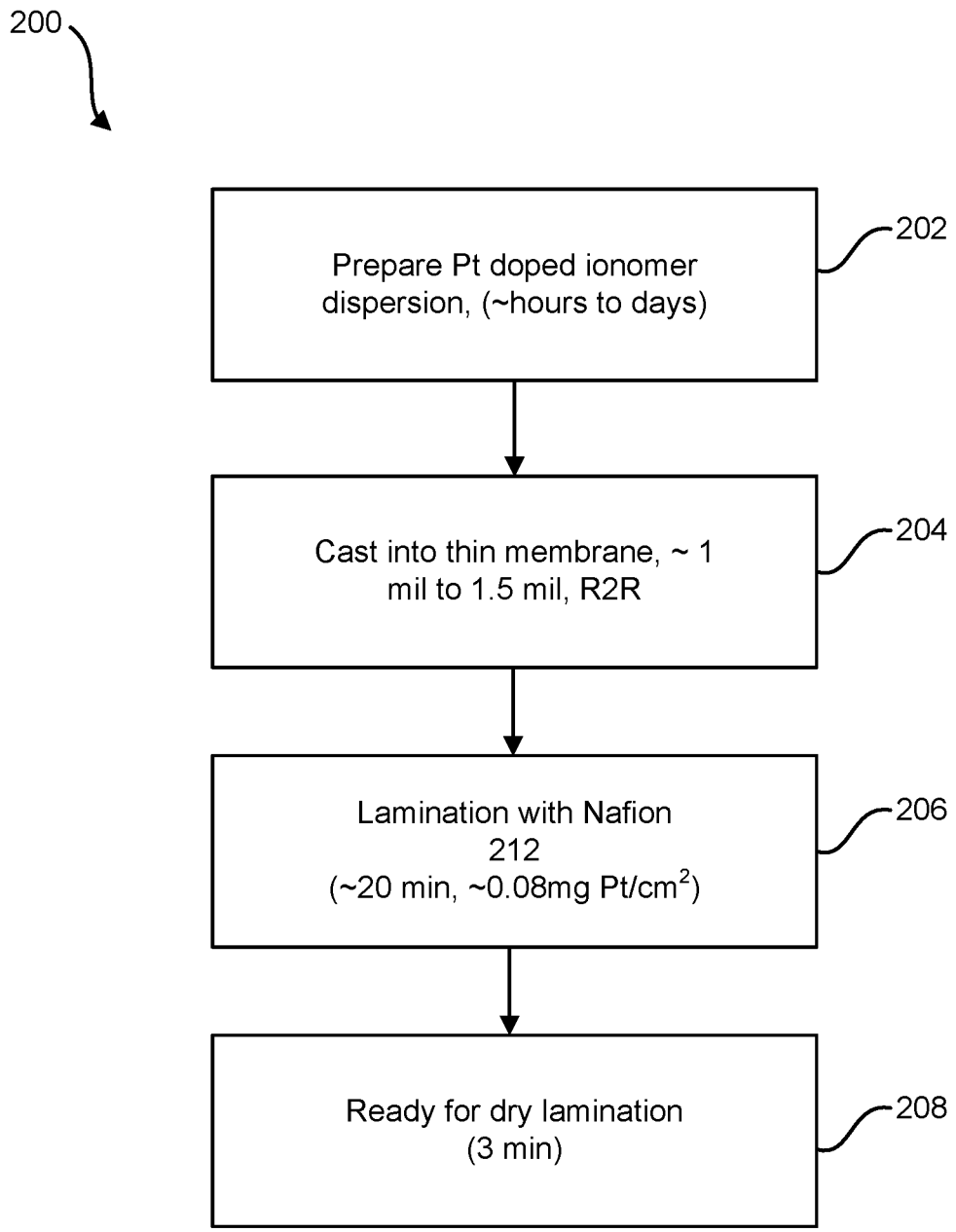
FIG. 3 is a flowchart for forming an exchange membrane, according to an embodiment of the present disclosure.

With reference to FIG. 3, FIG. 3 illustrates a method 200 employing a membrane lamination approach, according to an embodiment of the present disclosure. In this illustrated embodiment, method 200 includes, for example, in block 202 platinum (Pt) black material is incorporated in an ionomer containing ink (EG Nafion D2021) to form a uniform dispersion. In one example, a uniform platinum (Pt) doped ionomer dispersion may include 160 mg of Pt black, 10.1 mg of cerium hydroxide and 80 g of NAFION D2021 ionomer that is balled milled in a plastic container using mixing media. The dispersion is mixed for two days before it is ready to cast.

At block 204 the dispersion is cast into a thin membrane on a carrier substrate to form the Pt/ionomer layer. For example, the dispersion may be then coated on a substrate such as polyimide (Kapton) film such as a roll-to-roll process as described below.

At 206, the Pt/ionomer layer is then laminated to a membrane (e.g., NAFION 212) that does not have platinum (Pt) incorporated therein. For example, the Pt/ionomer layered decal is then laminated with NAFION NR212 membrane in a hot press at 320 degrees F. (Fahrenheit) for 3 minutes to form a bi-layer membrane with a thickness approximately 3.5 mil.

At 208, the by-layer membrane is ready for dry lamination to electrodes. For example, cathode and anode electrodes may then be laminated to the prepared bi-layer membrane to form a membrane electrode assembly (MEA). For example, cathode and anode electrodes may be then laminated on the NAFION NR212 side and the Pt/ionomer layer side of the bi-layer membrane, respectively, using a similar technique as the membrane lamination process, e.g., in a hot press at 320 degrees F. (Fahrenheit) for 3 minutes.

Figure 4:
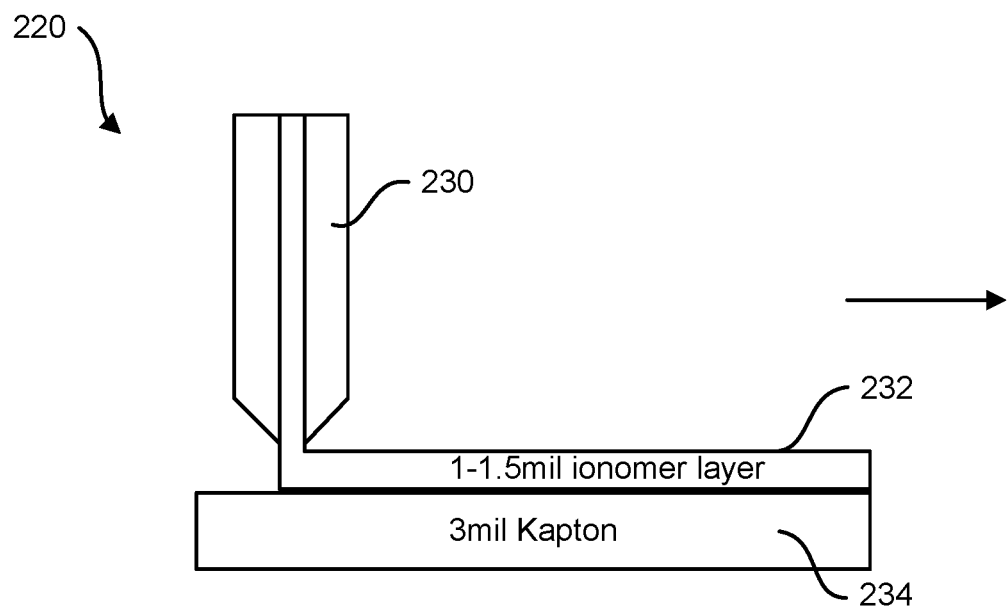
FIG. 4 is a diagrammatic illustration of a process for forming a layer membrane having a catalyst on a substrate, according to an embodiment of the present disclosure.

FIG. 4 diagrammatically illustrates a process 220 for casting the dispersion into a thin membrane on a carrier substrate to form a Pt/ionomer layer, according to an embodiment of the present disclosure. For example, a depositor 230 may include a controllable flow rate and a controllable gap so that the depositor such as an injector or extruder may continuously deposit a slurry layer 232 onto a moving substrate 234. The slurry 320 may include the ionomer with a catalyst such as platinum (Pt). The slurry may be deposed having a thickness of 1-1.5 mil, and the substrate may be polyimide backer film such as a 3 mil Kapton substrate, or a polyimide.

Figure 5:
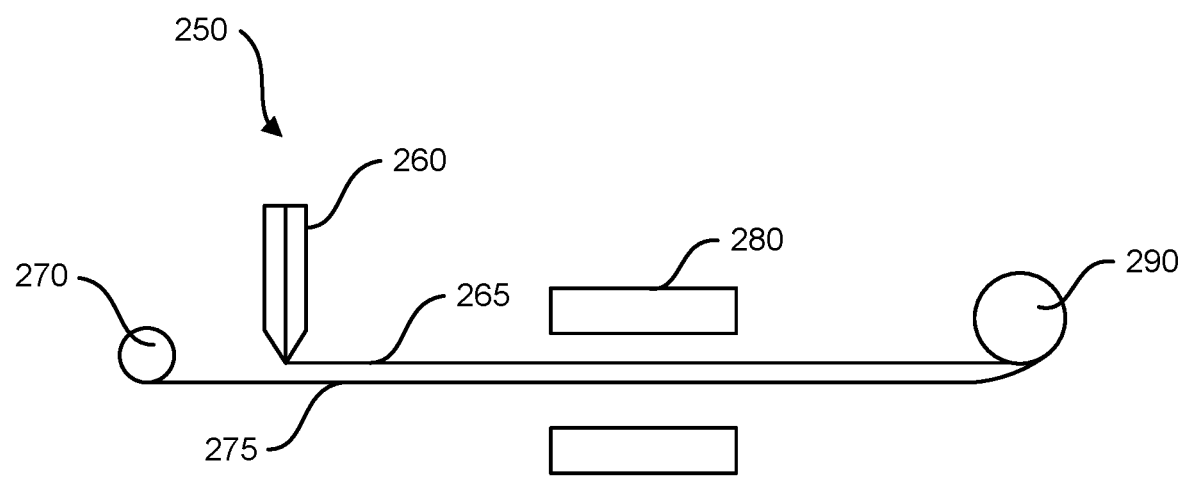
FIG. 5 is a diagrammatic illustration of a roll-to-roll process for forming a layer membrane having a catalyst on a substrate, according to an embodiment of the present disclosure

FIG. 5 illustrates a roll-to-roll process 250, according to an embodiment of the present disclosure. In this illustrated embodiment, a depositor 260 such as an injector or extruder may continuously deposit a slurry catalyst/ionomer layer 265 onto a moving first substrate 275, which moving substrate is unwound from a roll 270. The slurry 265 may include the ionomer with a catalyst such as platinum (Pt) and radical scavenger such as cerium hydroxide that may mitigate degradation of the membrane. The slurry may be deposed having a thickness of 1-1.5 mil, and the substrate may be a 3 mil Kapton substrate. The slurry may be cured or partially cured by [passing through a drying step such as passing through a heater or furnace 280. The dry catalyst/ionomer layer 265 and substrate may be wound onto a roll 290.

Figure 6:
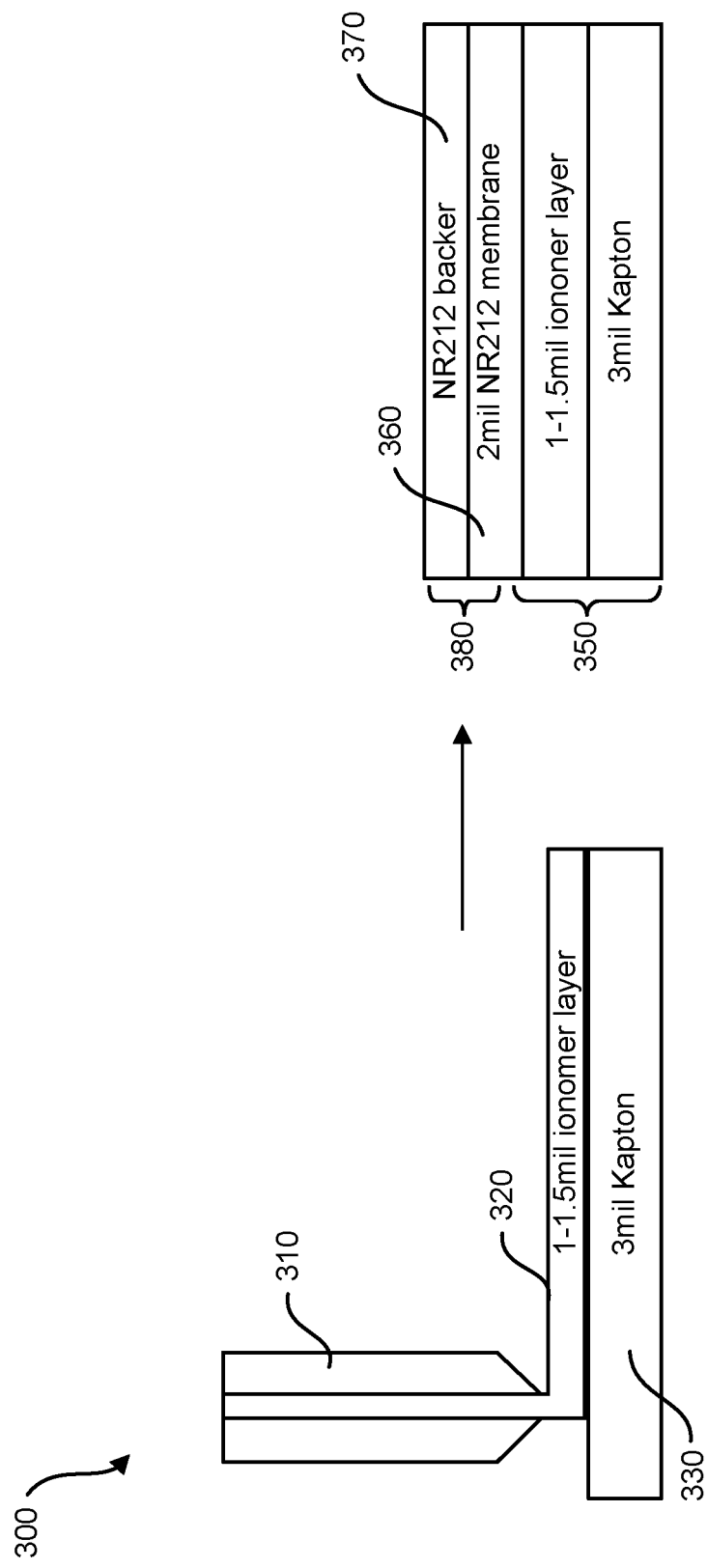
FIG. 6 is a diagrammatic illustration of a roll-to-roll process for forming a bi-layer membrane lamination, according to an embodiment of the present disclosure.

FIG. 6 diagrammatically illustrates a process 300 for forming a laminated bi-layer exchange membrane, according to an embodiment of the present disclosure. As illustrated in FIG. 6, an ionomer layer with a catalyst may be formed in a roll-to-roll process, and the bi-layer membrane may be formed in a lamination process. For example, a depositor 310 such as an injector or extruder may continuously deposit a slurry layer 320 onto a moving substrate 330. The slurry 320 may include the ionomer with a catalyst such as platinum (Pt). The slurry may be deposed having a thickness of about 1 mil, and the substrate may be a 3 mil Kapton substrate.

After the slurry is cured or partially cured such as passing through a dryer of furnace, the ionomer layer 320 and substrate 330 may be die cut and formed into a die cut structure 350 or otherwise processed to a desired shape or size. For example, die cut structure 350 may be sized based on the size of the desired membrane electrode assembly (MEA) to be fabricated. In some embodiments, then die cut structure 350 may have a size such as a 50 cm$^2$ or 1200 cm$^2$.

A die cut second structure 380 may include a membrane layer 360, for example, not having a catalyst and a second substrate 370. Membrane layer 360 may be a 2 mil NR212 membrane, and second substrate 370 may be a NR212 backer such as a 3 mil mylar layer. Die cut structure 350 and die cut structure 380 may be laminated together in a hot press.

Figure 7:
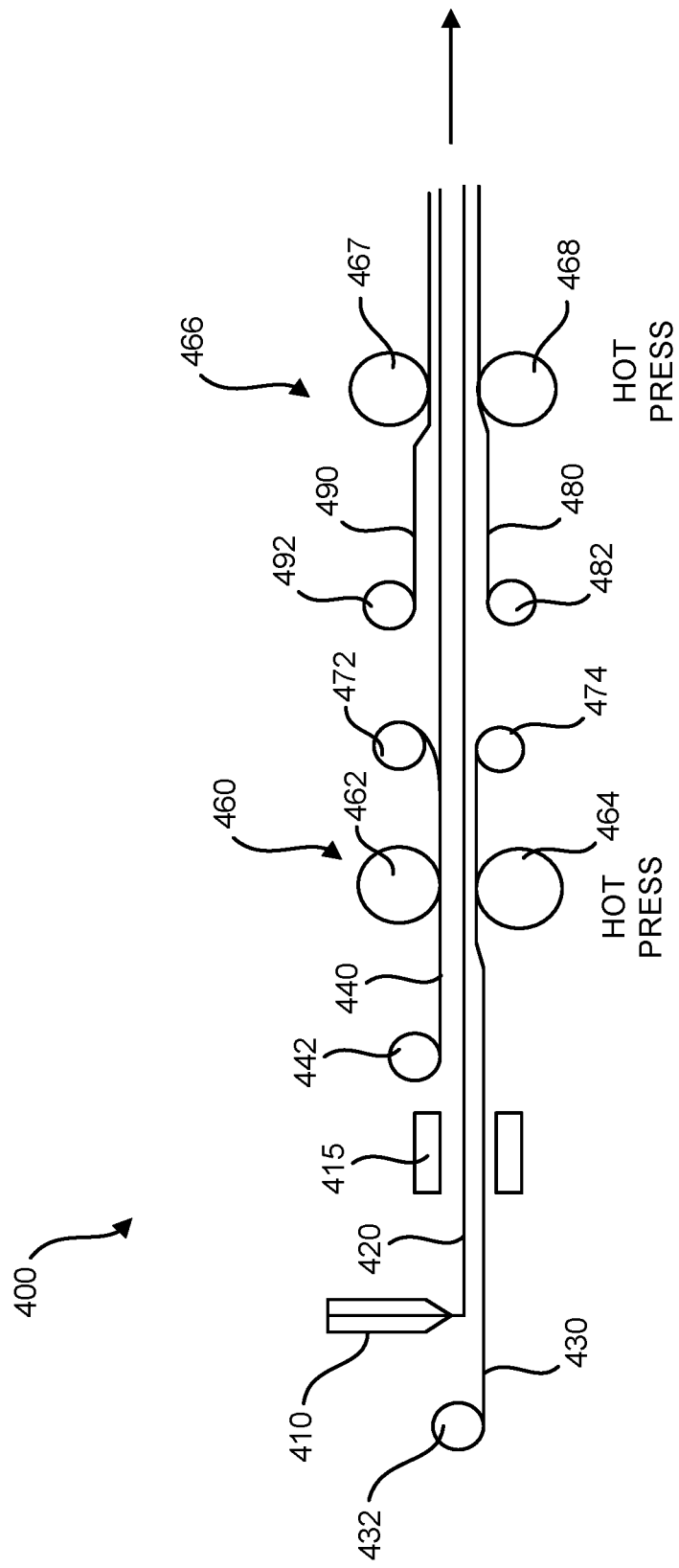
FIG. 7 is a diagrammatic illustration of a roll-to-roll process for forming a membrane electrode assembly employing a two-step lamination process, according to an embodiment of the present disclosure.

FIG. 7 illustrates a roll-to-roll process 400 for forming a MEA, for example, having a two-step lamination process, according to an embodiment of the present disclosure.

As illustrated in FIG. 7, a depositor 410 such as an injector or extruder may continuously deposit a slurry catalyst/ionomer layer 420 onto a moving first substrate 430, which moving substrate is unwound from a roll 432. The slurry 420 may include the ionomer with a catalyst such as platinum (Pt) and radical scavenger such as cerium hydroxide. The slurry may be deposed having a thickness of about 1 mil, and the substrate may be a 3 mil Kapton substrate. After the slurry is cured or partially cured such as by passing through a heater, furnace or dryer 415, a membrane layer 440, for example, not having a catalyst and disposed on a backer on one side is unwound from a roll 442 and deposited on the cured or partially cured slurry layer 420. Membrane layer 440 may be a 2 mil N212 membrane.

The layers are assembled and pass through a first hot press 460 having, for example, a first heated roller 462 and a second heated roller 464. First substrate 430 is removed and wound onto a roller 474 and the substrate on NR212 membrane 440 is removed and wound on a roller 472. An anode electrode 480 is unwound from a roll 482 and deposited on or deposited adjacent to catalyst layer 420. A cathode electrode 490 is unwound from a roll 492 and deposited on or disposed adjacent to membrane 440. Anode electrode 480, catalyst layer 420, membrane layer 440 without a catalyst, and cathode electrode 490 pass through a second hot press 466, for example, having a first heated roller 467 and a second heated roller 468 to form a laminated MEA.

Figure 8:
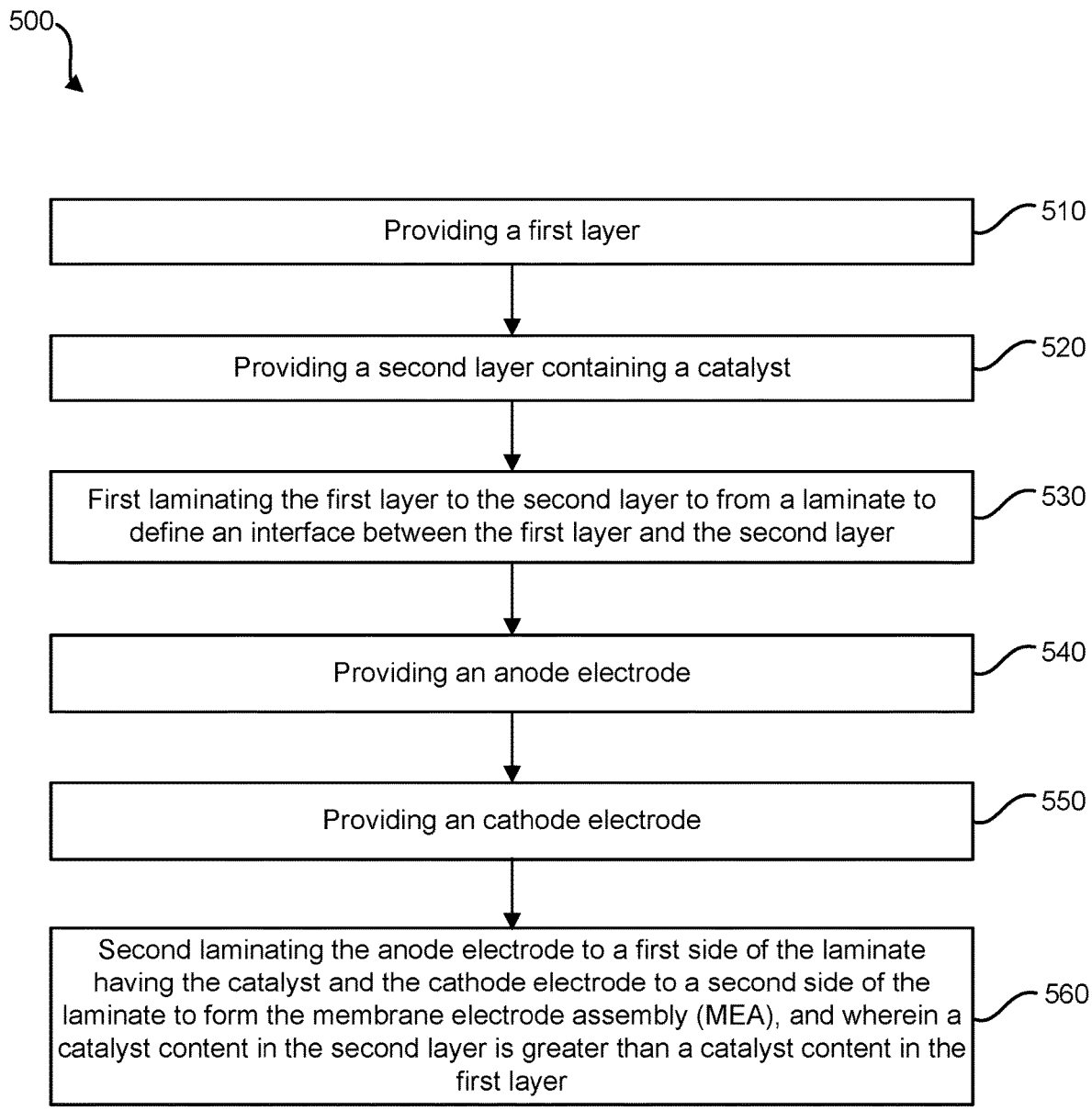
FIG. 8 is a flowchart for forming a membrane electrode assembly employing a bi-layer membrane lamination process, according to an embodiment of the present disclosure.

FIG. 8 illustrates a method 500 for forming a membrane electrode assembly, according to an embodiment of the present disclosure. In this illustrated embodiment, method 500 includes, for example, at 510, providing a first layer, at 520 providing a second layer containing a catalyst, at 530 providing an anode electrode, at 540 providing a cathode electrode, and at 550 forming the first layer, the second layer containing a catalyst, the anode electrode, and the cathode electrode into a membrane electrode assembly (MEA), wherein the first layer and the second layer form, and wherein a catalyst content in the second layer is greater than a catalyst content in the first layer.

Figure 9:
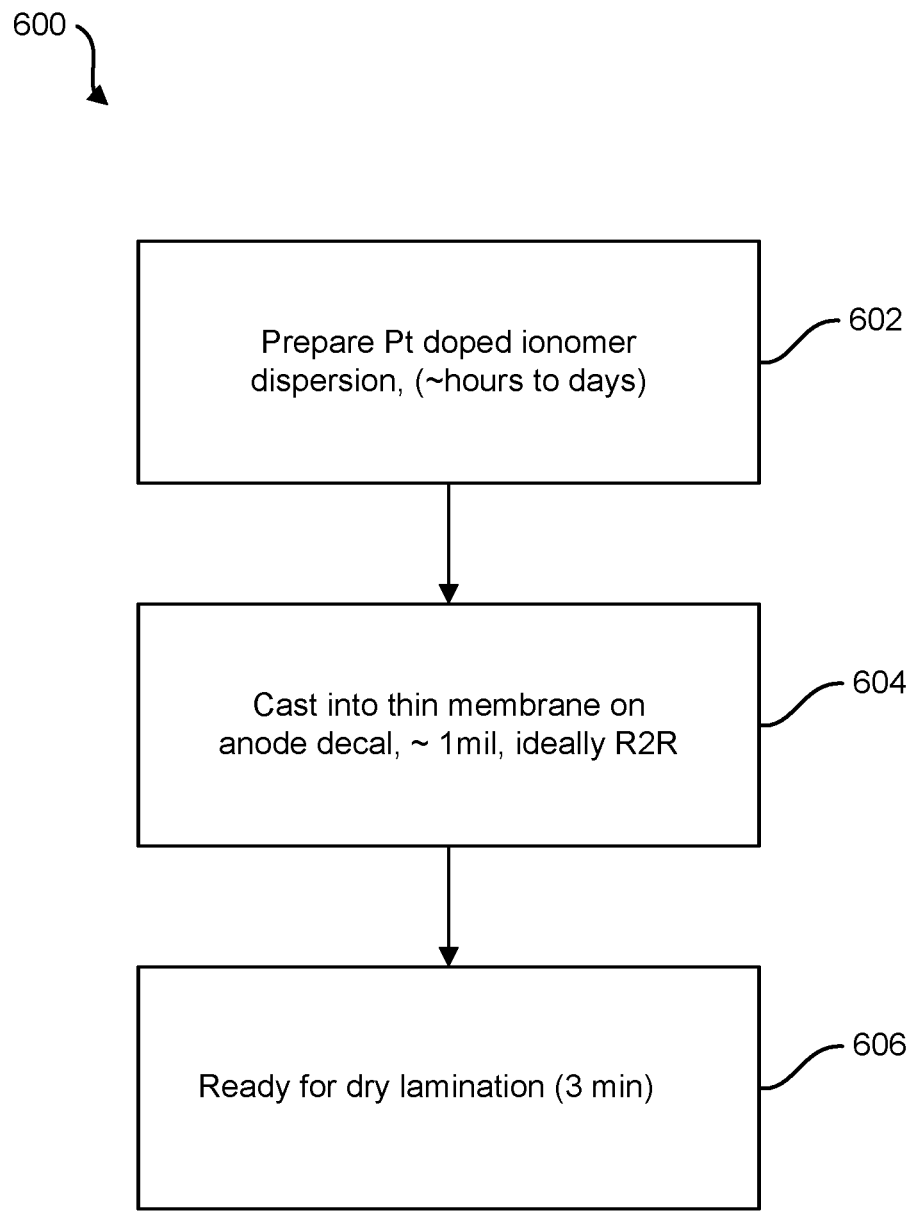
FIG. 9 is a flowchart for forming membrane electrode assembly employing a one-step lamination process, according to an embodiment of the present disclosure.

FIG. 9 illustrates a method 600 for forming a mitigation layer coated anode, according to an embodiment of the present disclosure. This exemplary approach may facilitate the use of only one high temperature lamination step during the fabrication of the membrane electrode assembly (MEA). The approach may simplify a membrane electrode assembly (MEA) fabrication process and reduce the time of high temperature lamination process which may cause mechanical and chemical degradation of the membrane, compared to the methods described and illustrated in FIGS. 4-8.

In this illustrated embodiment, as shown in FIG. 9, a method 600 includes in block 602 preparing a platinum (Pt) doped ionomer dispersion. The preparation may be the same as the platinum (Pt) doped ionomer dispersion prepared in block 202 (FIG. 3) described above. In block 604, the as-prepared platinum (Pt) doped ionomer dispersion is then cast on an anode decal. In this embodiment, the anode decal is anode catalyst layer plus a substrate liner. Multiple passes may be required until a 1.5 mil membrane thickness is achieved. The 1.5 mil layer may have about 0.01 to about 0.5 mg(Pt)/cm$^2$ PGM loading. In block 606, the mitigation layer coated anode is ready for dry lamination. For example, a commercial cathode or catalyst layer coated gas diffusion media may be then laminated via hot pressing on to both of a Nafion N212 membrane at 320 degrees F. for three minutes. The mitigation layer coated anode approach may potentially yield additional cost savings on the NAFION ionomer and recombination catalyst since the mitigation is only applied on the active area instead of being on the entire membrane area, and a single lamination step is required.

Figure 10:
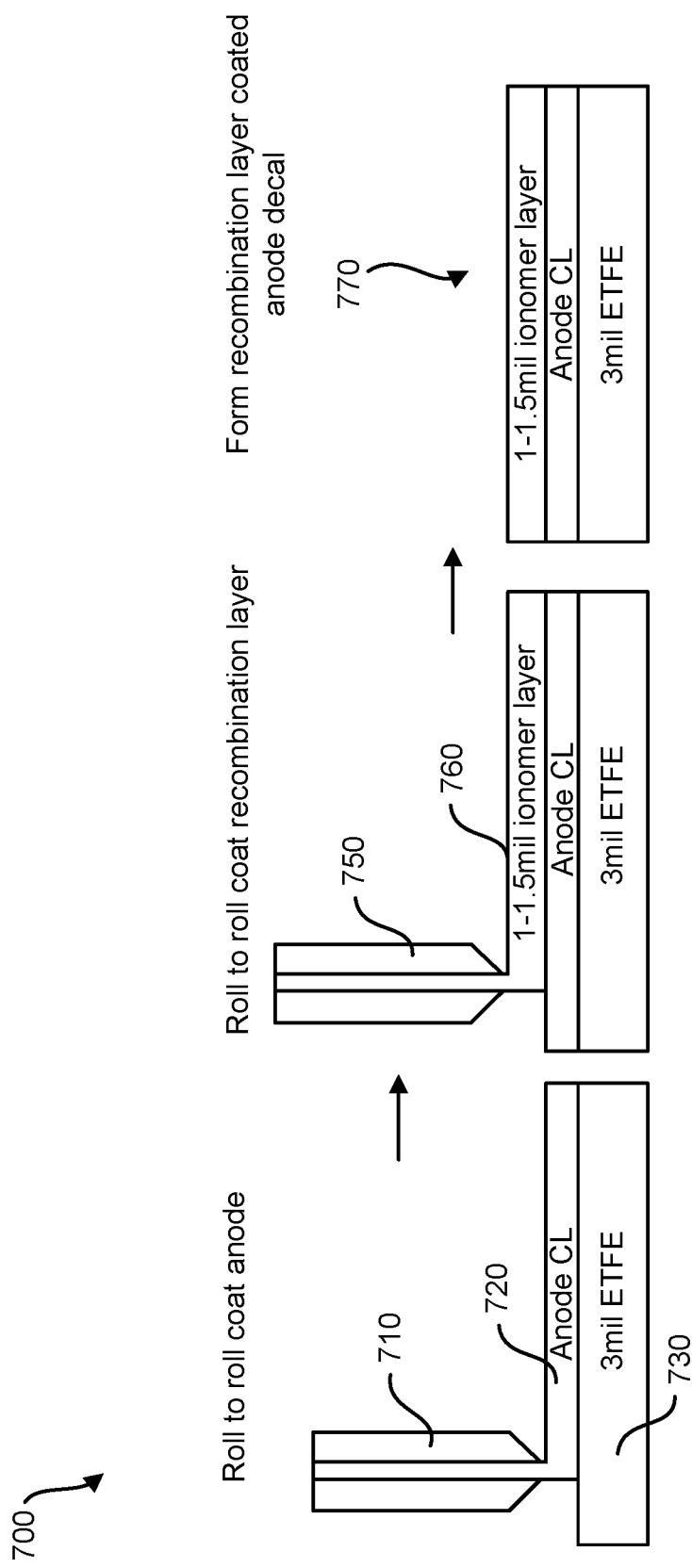
FIG. 10 is a flowchart for forming a recombination layer coated anode decal, according to an embodiment of the present disclosure.

FIG. 10 diagrammatically illustrates a process 700 for forming a recombination layer coated anode decal, according to an embodiment of the present disclosure. As illustrated in FIG. 10, an anode catalyst layer 720 may be formed in a roll-to-roll process. For example, a depositor 710 such as an injector or extruder may continuously deposit anode catalyst layer 720 onto a moving substrate 730. The deposited anode catalyst layer and substrate may pass through a dryer.

An ionomer layer with a catalyst may be formed in a roll-to-roll process. For example, a depositor 750 such as an injector or extruder may continuously deposit a slurry layer 760 onto a moving anode catalyst layer electrode 720 disposed and supported on a substrate 730. The slurry 760 may include the ionomer with a catalyst such as platinum (Pt) and radical scavenger such as Cerium hydroxide. The slurry may be deposed having a thickness of about 1-1.5 mil, and the substrate may be a 3 mil ethylene tetrafluoroethylene (ETFE), a fluorine-based plastic. The deposited ionomer layer with a catalyst may pass through a dryer.

The configured structure 770, e.g., formed recombination layer coated anode decal, may be die cut to a desired size. A membrane layer without a catalyst and a cathode electrode (not shown) may be disposed or otherwise placed on structure 700. A single lamination process, e.g., hot pressing, may be employed to form the membrane electrode assembly (MEA). In other embodiments, the membrane may be disposed on structure 770 in a roll-to-roll process. The membrane layer may be a 2 mil N212 membrane.

Figure 11:
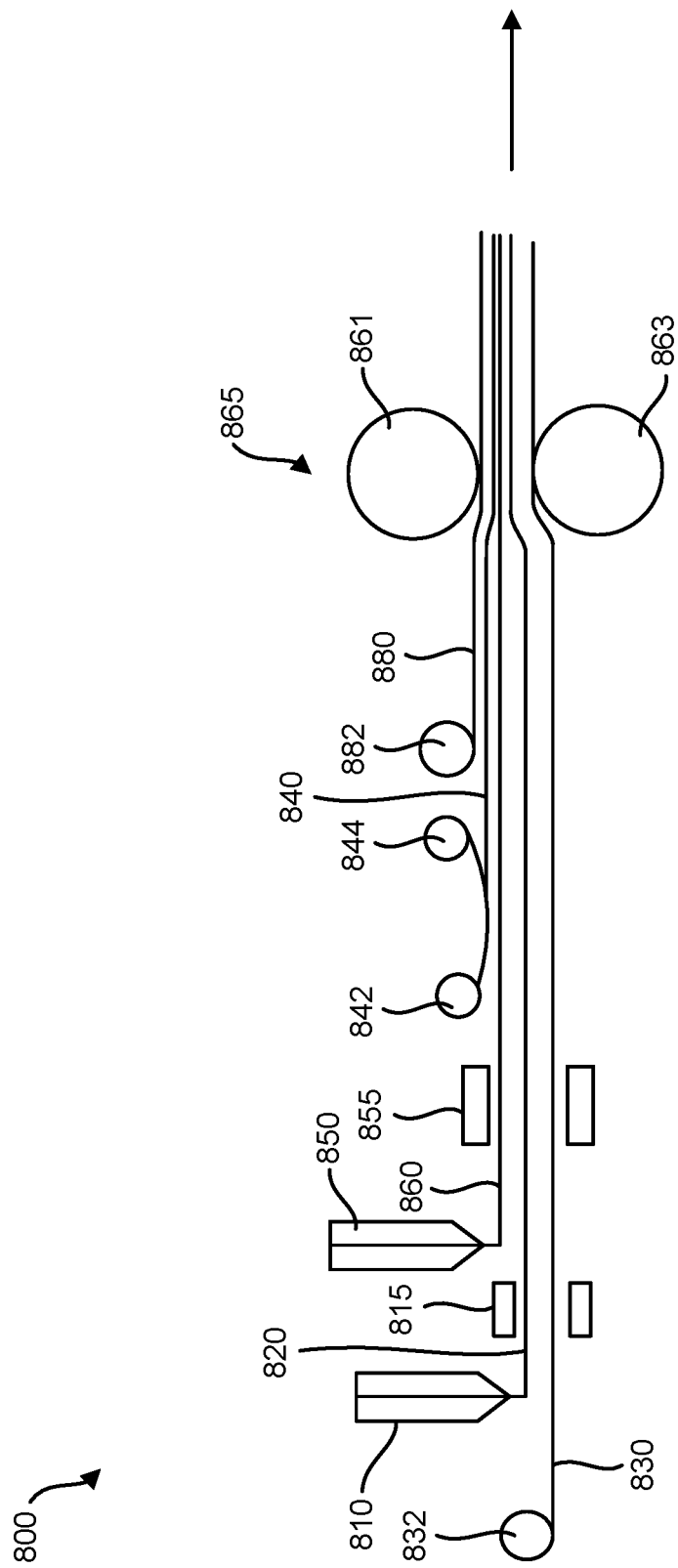
FIG. 11 is a diagrammatic illustration of a roll-to-roll process for forming a membrane electrode assembly employing a one-step lamination process with the membrane electrode assembly having a bi-layer membrane, according to an embodiment of the present disclosure.

FIG. 11 illustrates a roll-to-roll process 800 for forming a membrane electrode assembly (MEA), for example, having a one-step lamination process, according to an embodiment of the present disclosure.

As illustrated in FIG. 11, a depositor 810 such as an injector or extruder may continuously deposit an anode catalyst layer 820 onto a moving substrate 830. The deposited anode catalyst layer and substrate may pass through a dryer 815. A depositor 850 such as an injector or extruder may continuously deposit a slurry catalyst layer 860 onto a moving cathode electrode 820 and first substrate 830, which substrate is unwound from a roll 832, respectively. The slurry 860 may include the ionomer with a catalyst such as platinum (Pt) and radical scavenger such as cerium hydroxide. The slurry may be deposed having a thickness of about 1-1.5 mil, and substrate 830 may be a 3 mil ETFE substrate. The deposited slurry 860 may pass through a dryer 855. After the slurry is cured or partially cured, a membrane layer 840 not having a catalyst with a backer or second substrate on one side is unwound from a roll 842 and deposited on the cured or partially cured slurry layer 860, the backer being removed on a roll 844. Membrane layer 840 may be a 2 mil N212 membrane, and the second substrate or backing layer may be a 3 mil mylar layer. A cathode electrode 880 is unwound from a roll 882 and deposited on or deposited adjacent to membrane 840. The layers are assembled and may pass through a hot press 865 having, for example, a first heated roller 861 and a second heated roller 863 to form a laminated structure for an MEA.

In some embodiments, the dispersion may be cast into a thin membrane on a carrier substrate to form the Pt/ionomer layer. For example, the dispersion may be then coated on a substrate such as polyimide (Kapton) film using a doctor blade film applicator. Multiple layers of casting are performed as needed until, for example, a 1.5 mil of membrane thickness is achieved.

Figure 12:
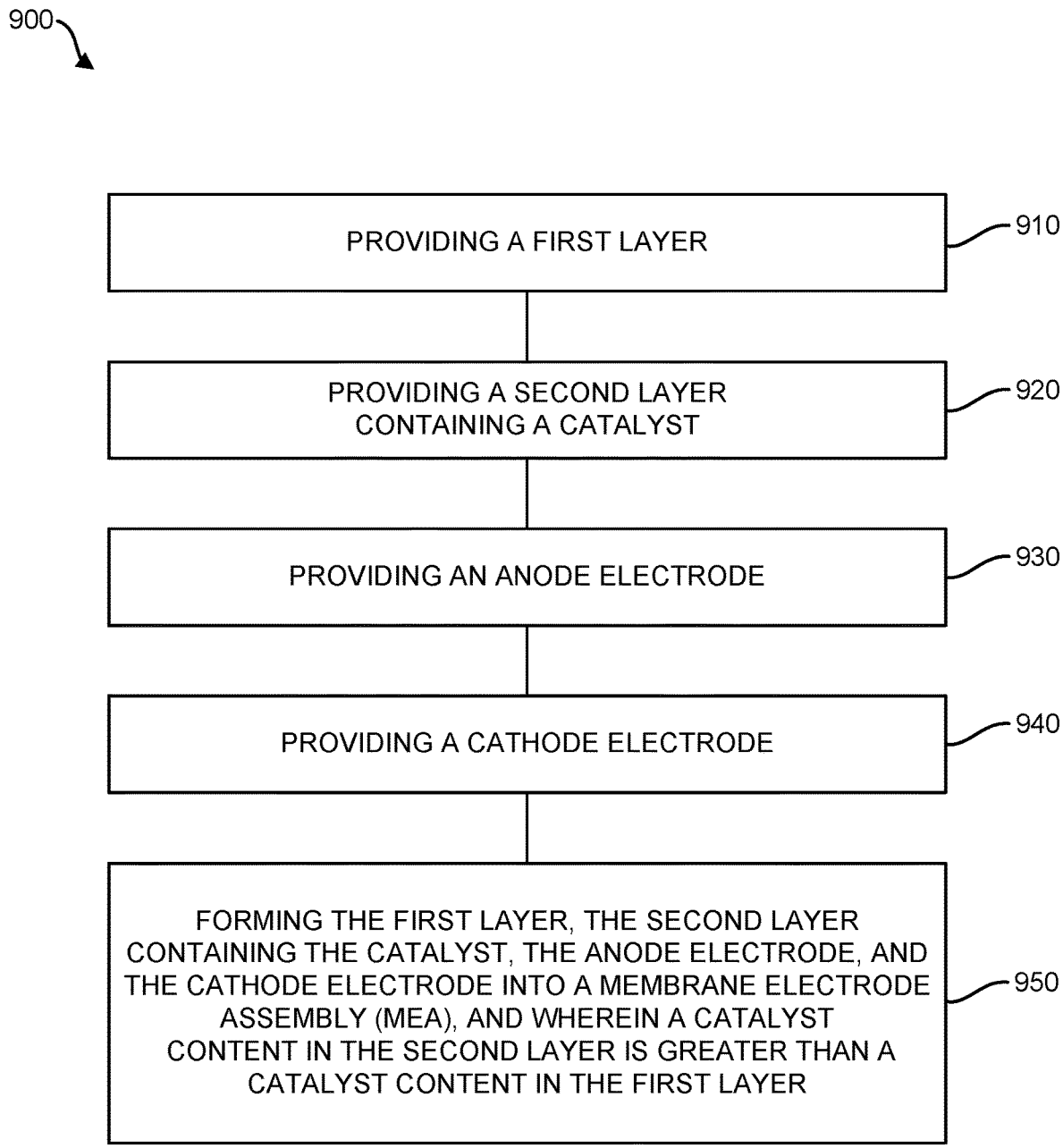
FIG. 12 is a flowchart for forming a membrane electrode assembly with a one-step lamination process having a bi-layer membrane, according to an embodiment of the present disclosure.

FIG. 12 illustrates a method 900 for forming a membrane electrode assembly, according to an embodiment of the present disclosure. In this illustrated embodiment, method 900 includes, for example, at 910 providing a first layer, at 920 providing a second layer containing a catalyst, at 930 providing an anode electrode, at 940 providing a cathode electrode, and at 950 forming the first layer, the second layer containing a catalyst, the anode electrode, and the cathode electrode into a membrane electrode assembly (MEA), wherein the first layer and the second layer form, and wherein a catalyst content in the second layer is greater than a catalyst content in the first layer.

Figure 13:
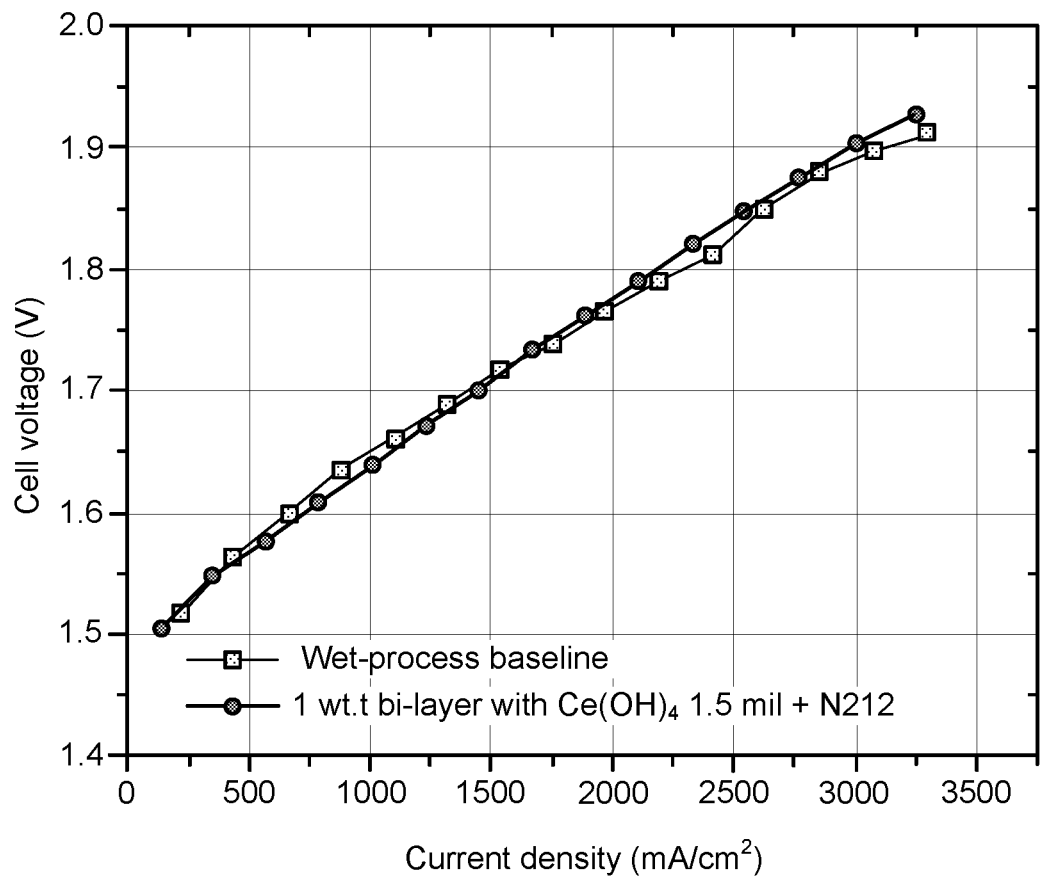
FIG. 13 is a graph of polarization curves of a traditional wet-process, and MEAs made from the two dry-process.

FIG. 13 illustrates test results of the traditional wet-built MEA using N115 membrane and the dry-built membrane electrode assemblies (MEAs) prepared from both approaches having a 3.5 mil thick bi-layer membrane. It was observed that the MEAs using the bi-layer membrane made from membrane lamination approach has a similar performance compared to a conventional wet-process MEA, which indicates the feasibility and potential for the dry-built PEM electrolyzer MEAs.

It will be appreciated that the technique of the present disclosure overcomes the problems with the spray coating approach of Klose et al. For example, the spray coating approach of Klose et al. is neither easily controlled nor well suited for large scale manufacturing. In addition, the spray coating approach is also limited by the low Pt utilization in the middle Pt interlayer. Hydrogen molecule has a much higher diffusivity compared to oxygen. Under high back pressure, hydrogen will travel much faster than oxygen in the membrane, thus the recombination will happen at the interface of the membrane and anode catalyst layer.

Figure 14:
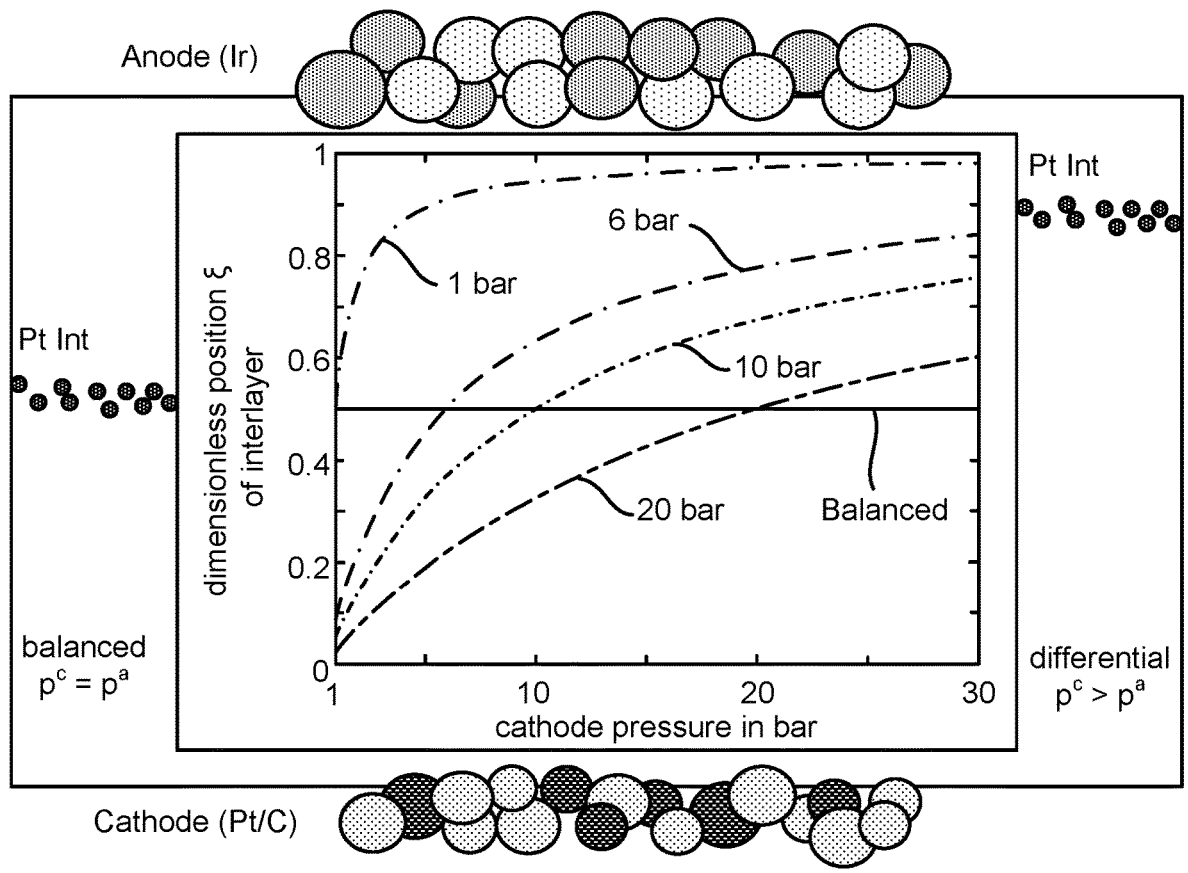
FIG. 14 is a prior art graph of the theoretical calculation of the optimized recombination layer thickness under different hydrogen backpressure.

The literature has described the theoretical calculation of the optimized recombination layer thickness under different hydrogen backpressure. FIG. 14 illustrates an ideal dimensionless position of a recombination interlayer (hydrogen flux twice the amount of oxygen flux) versus the cathode pressure. For anode pressure of 1 bar, 6 bar, 10 bar, 20 bar, and balanced pressure conditions. Calculations are for 80 degrees Celsius.

With higher hydrogen backpressure, the location of the recombination layer is disposed closer to the surface of electrolyzer anode. in the present disclosure with the condition of a 40 bar cathode and a 3 bar anode, the recombination layer may be within 10% thickness of the whole membrane thickness on the anode side. Another benefit of the present disclosure is the flexibility of tuning the thickness of the recombination to better accommodate different hydrogen backpressure operation. The recombination may be disposed at the membrane/anode interface.

Figure 15:
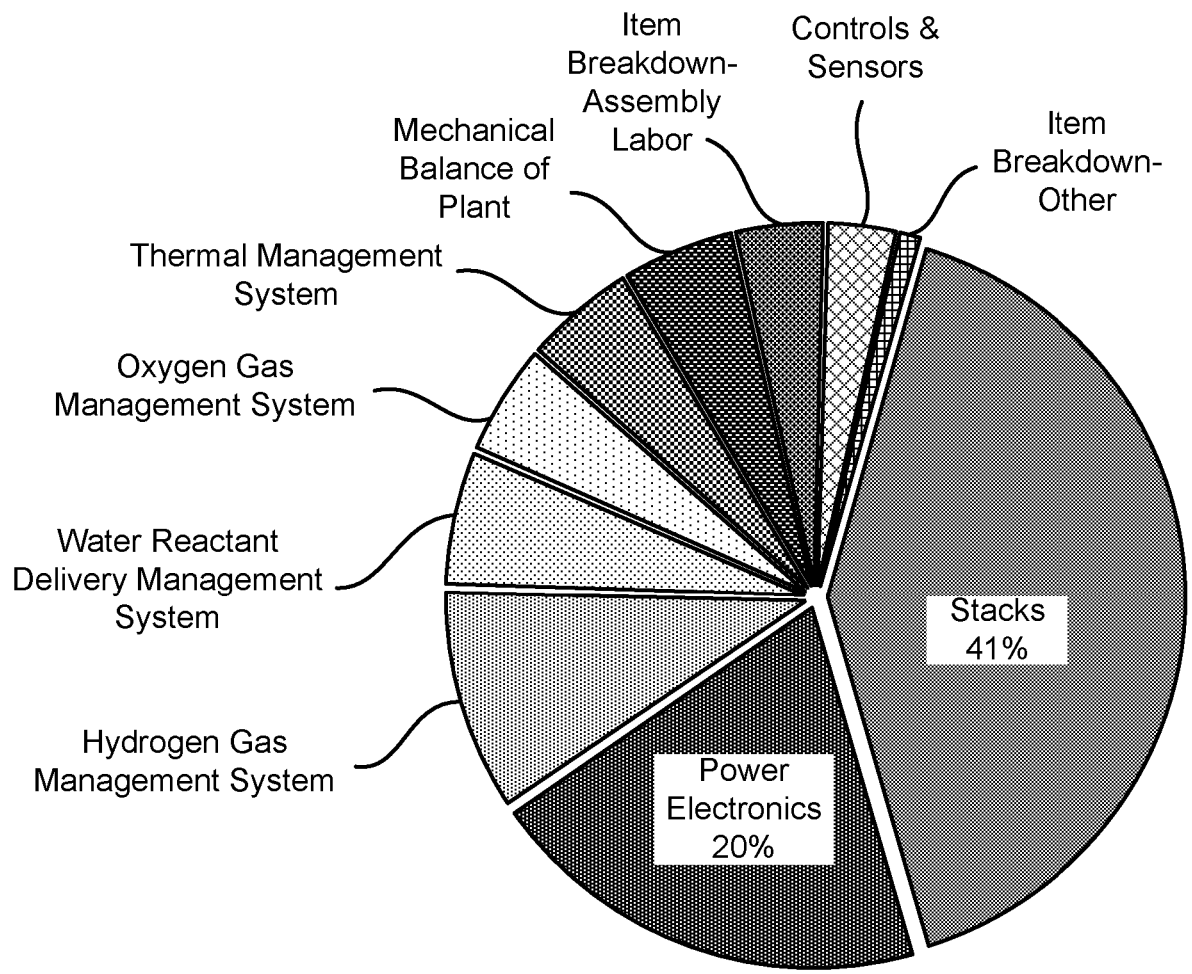
FIG. 15 is a prior art pie chart of a PEM electrolyzer system capital cost.

FIG. 15 illustrates a cost breakdown for a prior art PEM electrolyzer system capital cost. Colella, W. G., James, B.

D., Moton, J. M., Saur, G. and Ramsden, T., 2014, February, Techno-economic analysis of PEM electrolysis for hydrogen production, in *Electrolytic hydrogen production workshop, NREL*, Golden, Colorado (Vol. 27). As observed, the stack is the major component of the overall capital cost in a PEM electrolyzer system. The membrane electrode assembly (MEA) is one of the major components which comprises greater than 25 percent of the stack cost.

Figure 16:
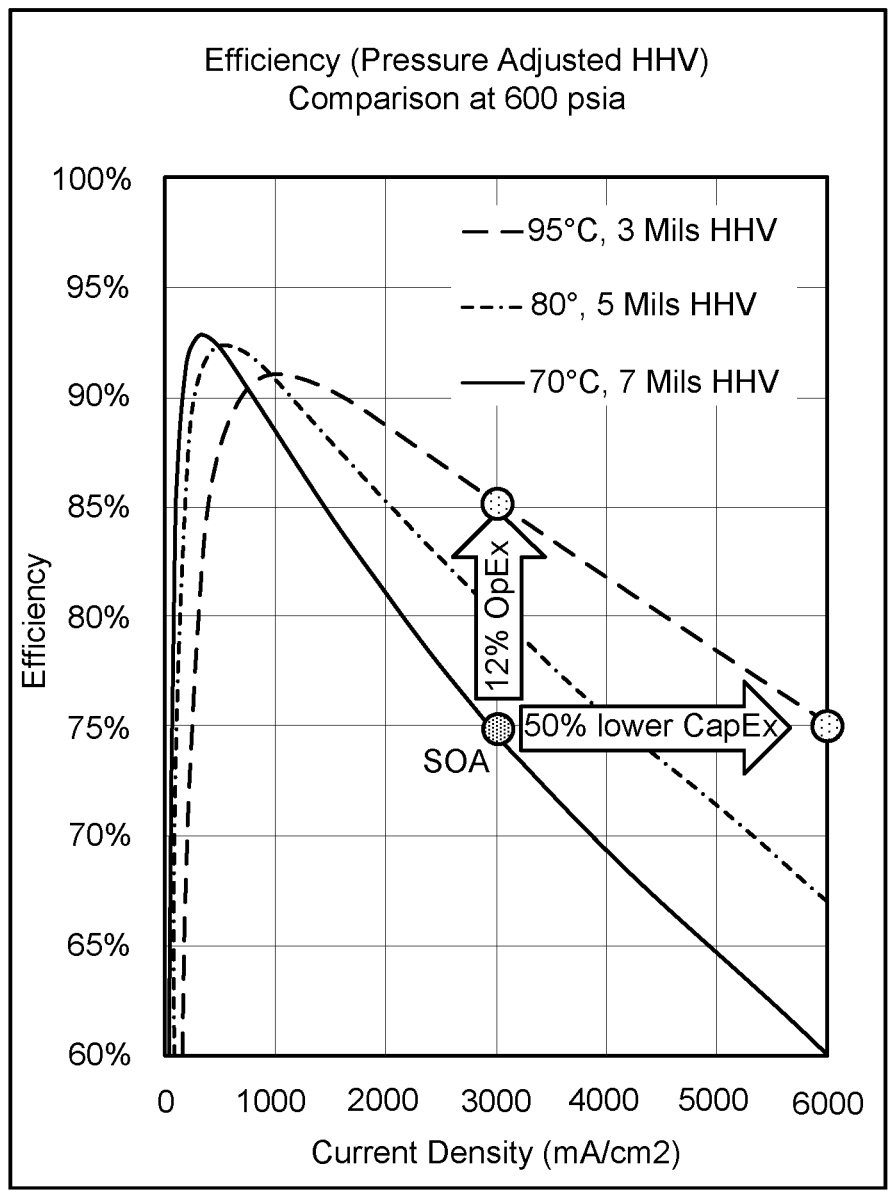
FIG. 16 is a graph of prior art PEM electrolyzer efficiency as a function of current density, operation temperature and membrane thickness.

As will be appreciated from the present disclosure, a fully dry membrane process may be desirable by reducing the membrane processing time and labor cost, compared with the wet membrane process. In addition, the dry membrane process can maintain the mechanical strength of the membrane while eliminating the dimensional change during the membrane processing. By avoiding sacrificing mechanical strength, using a thinner membrane becomes possible. In order to distribute the recombination catalyst layer only in the region where $H_2/O_2$ recombination reaction takes place, a separate recombination layer which contains uniformly distributed Pt nanoparticles may significantly reduce the $H_2$ crossover to reduce the safety hazard. Compared to the current state-of-art technique, in which the whole membrane is platinized, the recombination layer is more efficient and economical by reducing the amount of Pt in the membrane. In addition, the dry-built bi-layer membrane retains all the advantages of wet-built membrane while maintaining the mechanical strength of the membrane reducing the labor cost at the same time. Moreover, the dry process allows for thinner membranes as mechanical handling is improved, and membranes installed dry will expand in the thickness direction, compared to current state-of-the-art PEM electrolysis with a 0.005-0.007 inch (5-7 mil) membrane operating at 70 degrees C. and 3000 mA/cm2, a 0.003 inch (3 mil) membrane at 95 degrees C. can operate at twice the current density, thus halving CapEx of the electrolyzer stacks, as shown in FIG. 16. In an expensive electricity environment, one may be able to hold the current density constant while using 12% less energy at the stack level.

From the present description, it will be appreciated that the dry processing methods of the present disclosure provides advantages over conventional wet processing processes. For example, wet processing is a laborious and time-consuming process is not suitable for high throughput and multi-MW electrolyzer manufacturing. Once wet, the membranes must be kept and assembled wet. In addition, the wet process of the membrane takes about a large amount of labor cost for the electrolyzer manufacturing. As mentioned, the platinization of the membrane using conventional wet processing approach generally takes long time, which is time comsuming and introduces huge amount of labor cost. In addition to the long processing time and high labor cost, the platinization process disperses excess platinum particles indiscriminately through the entire membrane thickness, rather than where is it most effective. Considering the higher diffusion rates of $H_2$ and $O_2$, and much higher $H_2$ pressure, only the Pt particles closer to the anode side of the membrane are expected to be active in reducing crossover of $H_2$ through recombination; therefore, the particles in other locations are inactive and only serve to add unnecessary cost. Moreover, the complicated wet process also compromises the mechanical strength of the membrane. This is another reason that thicker membranes are preferred in PEMWEs. Thus, it will be appreciated from the present disclosure that by replacing the traditional wet-membrane process with a dry-membrane process using the techniques of the present disclosure described and illustrated, the material and labor cost associated with MW-scale electrolyzer manufacturing may be reduced, thus enabling the viable penetration and adoption of MW electrolyzers in the renewable energy storage market.

The present disclosure overcomes the drawbacks of the Klose et al. 8 mil tri layer membrane, which drawbacks include 1) membrane being too thick which impacts the efficiency of the electrolyzer dramatically, 2) spray and lamination process to produce the "tri-layer membrane" is time consuming and not valuable for mass production, and 3) the location of the recombination is in the middle of two membranes, which is not easy to tune the location of the layer.

Benefits of the present disclosure over the Klose et al. 8 mil tri layer membrane include 1) the bilayer membrane containing a 1 mil recombination layer plus NR212 membrane for in some embodiments totals a 3 mil thickness and allows for an efficient electrolyzer, 2) the whole process can be done in roll-to-roll that is fully automatic and suitable for mass production, and 3) the recombination layer in the present disclosure is located on the anode side of the membrane. By tuning the thickness of the recombination, it can be adapted to different hydrogen back pressure.

As may be recognized by those of ordinary skill in the art based on the teachings herein, numerous changes and modifications may be made to the above-described and other embodiments of the present disclosure without departing from the scope of the disclosure. The components of the MEAs as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the MEAs may include more or fewer components or features than the embodiments as described and illustrated herein. Accordingly, this detailed description of the currently-preferred embodiments is to be taken in an illustrative, as opposed to limiting of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

The invention claimed is:

1. A exchange membrane consisting of:
a first layer membrane having a first thickness;
a second layer membrane disposed directly on the first layer membrane, the second layer membrane having a thickness less than the first thickness, and the second layer membrane containing a mixture of a nanoparticle catalyst and an ionomer, the catalyst disposed throughout the thickness of the second layer membrane, a catalyst content in the second layer membrane being greater than a catalyst content in the first layer membrane;
the exchange membrane having an interface between the first layer membrane and the second layer membrane, wherein the first layer membrane and the second layer membrane contact each other at the interface;
the first layer membrane laminated to the second layer membrane to define a laminated bi-layer exchange membrane;
the bi-layer exchange membrane operable to allow the passage of cations;
wherein the bi-layer exchange membrane is operable in an membrane electrode assembly (MEA) upon application of an electrical supply to an anode electrode and a cathode electrode to conduct protons through the exchange membrane to electrolyze and split water into oxygen and hydrogen; and
wherein the laminated exchange membrane is disposed on a roll.

2. The exchange membrane of claim 1 wherein the first layer membrane does not include any catalyst.

3. The exchange membrane of claim 1 wherein the first layer membrane comprises an ionomer and does not include any catalyst.

4. The exchange membrane of claim 1 wherein the second layer membrane comprises the catalyst comprising platinum (Pt).

5. The exchange membrane of claim 1 wherein the exchange membrane comprises 1 percent of the catalyst by weight.

6. The exchange membrane of claim 1 wherein the first layer membrane comprises an ionomer and the second layer membrane comprises the catalyst comprising platinum (Pt).

7. The exchange membrane of claim 1 wherein the first layer membrane comprises a thickness of at least 1.5 mil to 2 mil, and the second layer membrane comprises a thickness of 1 mil to 1.5 mil.

8. The exchange membrane of claim 1 wherein the second layer membrane comprises the catalyst disposed uniformly throughout the thickness of an ionomer.

9. The exchange membrane of claim 1 wherein the catalyst comprises a platinum (Pt) nanoparticle catalyst.

10. A bi-layer membrane electrode assembly (MEA) consisting of:
a first layer membrane having a first thickness;
a second layer membrane disposed directly on the first layer membrane, the second layer membrane having a thickness less than the first thickness, and the second layer membrane containing a mixture of a nanoparticle catalyst and an ionomer, the catalyst disposed throughout the thickness of the second layer, the catalyst content in the second layer membrane being greater than a catalyst content in the first layer membrane;
the first layer membrane and the second layer membrane defining an exchange membrane having an interface between the first layer membrane and the second layer membrane wherein the first layer membrane and the second layer membrane contact each other at the interface;
the exchange membrane operable to allow the passage of cations;
an anode electrode disposed directly on the second layer membrane;
a cathode electrode disposed directly on the first layer membrane; and
wherein the bi-layer membrane electrode assembly (MEA) upon application of an electrical supply to the anode electrode and to the cathode electrode conducts protons through the exchange membrane to electrolyze and split water into oxygen and hydrogen.

11. The membrane electrode assembly (MEA) of claim 10 wherein the first layer membrane does not include any catalyst.

12. The membrane electrode assembly (MEA) of claim 10 wherein the second layer comprises a casted layer.

13. The membrane electrode assembly (MEA) of claim 10 wherein the first layer membrane comprises an ionomer and does not include any catalyst.

14. The membrane electrode assembly (MEA) of claim 10 wherein the exchange membrane comprises a laminated exchange membrane.

15. The membrane electrode assembly (MEA) of claim 10 wherein the second layer membrane comprises the catalyst comprising platinum (Pt).

16. The membrane electrode assembly (MEA) of claim 10 wherein the exchange membrane comprises 1 percent of the catalyst by weight.

17. The membrane electrode assembly (MEA) of claim 10 wherein the first layer membrane comprises an ionomer and the second layer membrane comprises the catalyst comprising platinum (Pt).

18. The membrane electrode assembly (MEA) of claim 10 wherein the first layer membrane comprises a thickness of at least 1.5 mil to 2 mil, and the second layer membrane comprises a thickness of 1 mil to 1.5 mil.

19. The membrane electrode assembly (MEA) of claim 10 wherein the second layer membrane comprises the catalyst disposed uniformly throughout the thickness of an ionomer.

20. The membrane electrode assembly (MEA) of claim 10 wherein the catalyst comprises a platinum (Pt) nanoparticle catalyst.

* * * * *